US010192173B2

(12) United States Patent
Stephens et al.

(10) Patent No.: US 10,192,173 B2
(45) Date of Patent: Jan. 29, 2019

(54) SYSTEM AND METHOD FOR TRAINING OF STATE-CLASSIFIERS

(71) Applicant: THE UNITED STATES OF AMERICA, AS REPRESENTED BY THE ADMINISTRATOR OF THE NASA, Washington, DC (US)

(72) Inventors: Chad L. Stephens, Poquoson, VA (US); Angela R. Harrivel, Poquoson, VA (US); Alan T. Pope, Poquoson, VA (US); Lawrence J Prinzel, III, Yorktown, VA (US)

(73) Assignee: THE UNITED STATES OF AMERICA AS REPRESENTED BY THE ADMINISTRATOR OF THE NATIONAL AERONAUTICS AND SPACE ADMINISTRATION, Washington, DC (US)

( * ) Notice: Subject to any disclaimer, the term of this patent is extended or adjusted under 35 U.S.C. 154(b) by 0 days.

(21) Appl. No.: 15/490,130

(22) Filed: Apr. 18, 2017

(65) Prior Publication Data
US 2017/0220956 A1 Aug. 3, 2017

Related U.S. Application Data

(63) Continuation-in-part of application No. 14/212,159, filed on Mar. 14, 2014, now Pat. No. 9,623,324, (Continued)

(51) Int. Cl.
G06N 99/00 (2010.01)
G06N 5/04 (2006.01)
(Continued)

(52) U.S. Cl.
CPC .......... *G06N 99/005* (2013.01); *A63F 13/211* (2014.09); *A63F 13/212* (2014.09);
(Continued)

(58) Field of Classification Search
CPC ..... A61B 5/165; A61B 5/7264; G06N 99/005
See application file for complete search history.

(56) References Cited

U.S. PATENT DOCUMENTS 4,337,049 A 6/1982 Connelly
4,508,510 A 4/1985 Clifford
(Continued)

OTHER PUBLICATIONS

Pope, A. T. et al., "Biocybernetic System Validates Index of Operator Engagement, in Automated Task." Biological Psychology, May 1995. pp. 187-195. vol. 40, Issues 1-2.
(Continued)

*Primary Examiner* — Jerry-Daryl Fletcher
(74) *Attorney, Agent, or Firm* — Jonathan B. Soike; Robin W. Edwards; Mark P. Dvorscak

(57) ABSTRACT

Method and systems are disclosed for training state-classifiers for classification of cognitive state. A set of multimodal signals indicating physiological responses of an operator are sampled over a time period. A depiction of operation by the operator during the time period is displayed. In response to user input selecting a cognitive state for a portion of the time period, the one or more state-classifiers are trained. In training the state-classifiers, the set of multimodal signals sampled in the portion of the time period are used as input to the one or more state-classifiers and the selected one of the set of cognitive states is used as a target result to be indicated by the one or more state-classifiers.

20 Claims, 8 Drawing Sheets

Related U.S. Application Data which is a continuation-in-part of application No. 13/166,166, filed on Jun. 22, 2011, now Pat. No. 8,827,717.

(60) Provisional application No. 61/781,355, filed on Mar. 14, 2013, provisional application No. 61/499,733, filed on Jun. 22, 2011, provisional application No. 61/361,084, filed on Jul. 2, 2010.

(51) Int. Cl.
| | |
|---|---|
| *G06F 3/0482* | (2013.01) |
| *G06F 3/147* | (2006.01) |
| *A63F 13/211* | (2014.01) |
| *A63F 13/213* | (2014.01) |
| *A63F 13/42* | (2014.01) |
| *A63F 13/212* | (2014.01) |

(52) U.S. Cl.
CPC ............ *A63F 13/213* (2014.09); *A63F 13/42* (2014.09); *G06F 3/0482* (2013.01); *G06F 3/147* (2013.01); *G06N 5/04* (2013.01)

(56) References Cited

U.S. PATENT DOCUMENTS

| | | | |
|---|---|---|---|
| 5,377,100 | A | 12/1994 | Pope et al. |
| 5,626,140 | A | 5/1997 | Feldman et al. |
| 5,697,791 | A | 12/1997 | Nashner et al. |
| 5,702,323 | A | 12/1997 | Poulton |
| 5,743,744 | A | 4/1998 | Cassily et al. |
| 5,907,819 | A | 5/1999 | Johnson |
| 5,947,868 | A | 9/1999 | Dugan |
| 5,984,684 | A | 11/1999 | Brostedt et al. |
| 6,067,468 | A | 5/2000 | Korenman et al. |
| 6,093,146 | A | 7/2000 | Filangeri |
| 6,104,948 | A | 8/2000 | Bogart et al. |
| 6,126,449 | A | 10/2000 | Burns |
| 6,132,337 | A | 10/2000 | Krupka et al. |
| 6,148,280 | A | 11/2000 | Kramer |
| 6,212,427 | B1 | 4/2001 | Hoover |
| 6,259,889 | B1 | 7/2001 | Ladue |
| 6,261,189 | B1 | 7/2001 | Saville et al. |
| 6,277,030 | B1 | 8/2001 | Baynton et al. |
| 6,425,764 | B1 | 7/2002 | Lamson |
| 6,463,365 | B1 | 10/2002 | Fry |
| 6,463,385 | B1 | 10/2002 | Fry |
| 6,478,735 | B1 | 11/2002 | Pope et al. |
| 6,491,647 | B1 | 12/2002 | Bridger et al. |
| 6,527,700 | B1 | 3/2003 | Manico et al. |
| 6,682,351 | B1 | 1/2004 | Abraham-Fuchs et al. |
| 6,774,885 | B1 | 8/2004 | Oshri |
| 6,778,866 | B1 | 8/2004 | Bettwy |
| 6,786,730 | B2 | 9/2004 | Bleckley et al. |
| 8,062,129 | B2 | 11/2011 | Pope et al. |
| 8,164,485 | B2 | 4/2012 | Prinzel, III et al. |
| 8,628,333 | B2 | 1/2014 | Prinzel, III et al. |
| 8,827,717 | B2 | 9/2014 | Pope et al. |
| 8,858,323 | B2 | 10/2014 | Pope et al. |
| 8,858,325 | B2 | 10/2014 | Pope et al. |
| 9,084,933 | B1 | 7/2015 | Pope et al. |
| 9,283,468 | B2 | 3/2016 | Prinzel, III et al. |
| 9,848,812 | B1 | 12/2017 | Harrivel et al. |
| 2003/0013071 | A1 | 1/2003 | Thomas |
| 2003/0013072 | A1 | 1/2003 | Thomas |
| 2003/0087220 | A1 | 5/2003 | Bessette |
| 2003/0139654 | A1* | 7/2003 | Kim .................. A61B 5/02405 600/300 |
| 2005/0014113 | A1 | 1/2005 | Fleck et al. |
| 2008/0081692 | A1 | 4/2008 | Pope et al. |
| 2009/0082692 | A1* | 3/2009 | Hale .................. A61B 5/0476 600/544 |

OTHER PUBLICATIONS

Azcarate, A. et al., "Automatic Facial Emotion Recognition," Universiteit van Amsterdam, 1995, Vision and Image Understanding, pp. 38-59, vol. 61, No. 1.

Dinges, D. F. et al., "Optical Computer Recognition of Facial Expressions Associated with Stress Induced by Performance Demands," Aviation, Space, and Environmental Medicine, 2005, pp. 172-182, vol. 76, No. 6, Section II.

Keltner D. et al., "Facial Expressions of Emotion," Handbook of Emotions, 2nd ed., 2000, pp. 236-245, Guliford Publications, Inc, New York.

Lerner, J. S. et al., "Facial Expressions of Emotion Reveal Neuroendocrine and Cardiovascular Stress Responses," Biological Psychiatry, 2007, pp. 253-260, vol. 61, No. 2.

Ratliff, M. S. et al., "Emotion Recognition Using Facial Expressions will Active Appearance Models," Third IASTED International Conference on Human Computer Interaction, Understanding Users, 2008, pp. 138-143.

Arkadiusz, Stopczynski et al., "Smartphones as Pocketable Labs: Visions for Mobile Brain Imaging and Neurofeedback," International Journal of Psychophysiology, 2014, vol. 91, pp. 54-66.

Maarten De Vos et al., "Towards a truly mobile auditory brain-computer interface: Exploring the P300 to take away," International Journal of Psychophysiology, 2014, vol. 91, pp. 46-53, University of Oldenburg, Germany.

Stephens, C.L. et al., "Adaptive Automation for Mitigation of Hazardous States of Awareness;" 2012, The Handbook of Operator Fatigue, Chapter 26, edited by Matthews, Desmond, Neubauer and Hancock.

Pope, Alan T. et al., "Biocybernetic Adaptation as Biofeedback Training Method," Springer, 2014, pp. 91-114.

Pope, A.T. et al., "Interpersonal Biocybernetics: Connecting through Social Psychophysiology," 2012, ACM International Conference on Multimodel Interaction, pp. 1-5, Santa Monica, CA.

Pope, A.T. et al., "MoveMental: Integrating Movement and the Mental Game," Brain and Body Interfaces: Designing for Meaningful Interaction. May 7-12, 2011, pp. 1-5, Vancouver, BC Canada.

Harrivel, A. R. et al.,"Psychophysiological Sensing and State Classification for Attention Management in Commercial Aviation", AIAA SciTech Forum, Jan. 4-8, (AIAA 2016-1490), San Diego, California.

Santiago-Espada, Y, et al., "The Multi-Attribute Task Battery II (MATB-II) Software for Human Performance and Workload Research A User's Guide", Jul. 2011, NASA TM-2011-217164, pp. 1-74.

Hart, S. G., et al., Development of NASA-TLX (Task Load Index): Results of Empirical and Theoretical Research., Advances in Psychology, Human Mental Workload, 1988, pp. 139-183, vol. 52.

Fairclough, S.H., et al., Construction of the Biocybernetic Loop: A Case Study, Paper Presented at the 14th ACM International Conference on Multimodal Interaction, Oct. 22-26, 2012, pp. 1-8, Santa Monica, CA.

Wilhelm, F. H., et al., "Emotions Beyond laboratory: Theoretical Fundaments, Study Design, and Analytic Strategies for advanced Ambulatory Assessment", Biological Psychology, Feb. 2010, pp. 552-569, vol. 84.

Stevens, R.H., et al., EEG-Related Changes in Cognitive Workload, Engagement and Distractions as Students Acquire Problem Solving Skills, 11th International Conference, UM, Jun. 25-29, 2007, pp. 187-196, Corfu, Greece.

Solovey, T.S., et al., Designing Implicit Interfaces for Physiological Computing: Guidelines and Lessons Learned Using INIRS, ACM Transactions on Computer-Human Interaction, Jan. 2015, Article 35, pp. 35:1-35:27, vol. 6.

Harrivel, et al., "Crew State Monitoring (CSM) and Trust in Humans (TIH)", NASA Langley Research Center Presentation Slides, Crew System and Aviation Operations Peer Review, Jan. 27, 2016, pp. 1-63, Hampton, Va.

Taylor, R.M., "Situational awareness rating technique (SART): The development of a tool for aircrew systems design. Situational Awareness in Aerospace Operations", AGARD-Conference Proceeding-478, 1990, pp. 3-1-3-37, Neuilly Sur Seine, France.

(56) References Cited

OTHER PUBLICATIONS

Wilson, G.F., et al, "Real-Time Assessment of Mental Workload Using Psychopysiological Measures and Artificial Neural Networks", The Journal of Human Human Factors, Winter 2003, pp. 635-643, vol. 45, No. 4.

Wilson, G.F., et al., "Operator Functional State Classifications Using Multiple Psychophysiological Features in an Air Traffic Control Task", The Journal of Human Human Factors, Fall 2003, pp. 635-643, vol. 45, No. 3.

Li, F., "Improving Engagement Assessment by Model Individualization and Deep Learning", A Disseration Submitted to the Faculty of Old Dominion, Doctor of Philosophy, Electrical and Computer Engineering, Mar. 2015, Chapters 3 pp. 21-33 and Chapter 5 pp. 49-63.

Thomas, L. C., et al., Fatigue Detection in Commercial Flight Operations: Results Using Physiological Measures, Procedia Manufacturing, 2013, pp. 2357-2364, vol. 3.

\* cited by examiner

FIG. 5

SYSTEM AND METHOD FOR TRAINING OF STATE-CLASSIFIERS

CROSS-REFERENCE TO RELATED PATENT APPLICATION(S)

This patent application is a continuation-in-part of, and claims the benefit of and priority to, co-pending U.S. application Ser. No. 14/212,159 entitled PHYSIOLOGICALLY MODULATING VIDEOGAMES OR SIMULATIONS WHICH USE MOTION-SENSING INPUT DEVICES filed Mar. 14, 2014, which claims the benefit of and priority to each of: U.S. patent application Ser. No. 13/166,166 entitled PHYSIOLOGICALLY MODULATING VIDEOGAMES OR SIMULATIONS WHICH USE MOTION-SENSING INPUT DEVICES filed Jun. 22, 2011, which claims the benefit of and priority to each of U.S. Provisional Patent Application No. 61/361,084, filed Jul. 2, 2010, and U.S. application Ser. No. 61/499,733, entitled METHOD AND SYSTEM FOR PHYSIOLOGICALLY MODULATING VIDEOGAMES WHICH USE HAND AND BODY MOTION-SENSING INPUT DEVICES filed Jun. 22, 2011; and U.S. application Ser. No. 61/781,355, entitled METHOD AND SYSTEM FOR PHYSIOLOGICALLY MODULATING VIDEOGAMES WHICH USE HAND AND BODY MOTION-SENSING INPUT DEVICES filed Mar. 14, 2013, the entire contents of each of the foregoing applications being incorporated herein by reference in its entirety.

STATEMENT REGARDING FEDERALLY SPONSORED RESEARCH OR DEVELOPMENT

The invention described herein was made by employees of the Government of the United States of America and may be manufactured and used by or for the Government of the United States of America for governmental purposes without the payment of any royalties thereon or therefore.

OVERVIEW

The present disclosure generally relates to evaluation of cognitive states of a device and/or vehicle operator and more particularly relates to evaluation of the cognitive state based on physiological responses of the operator. With increased sophistication in technology, cognitive state of a human operator has increasingly become an important and frequently limiting factor in the proper performance of many advanced technology job-related tasks. For instance, attention-related human performance limiting states (AHPLS), such as channelized attention, diverted attention, inattention, confirmation biased, and startle (to include surprise), are significant concerns in safety critical applications, such as operation of passenger aircrafts. If an operator is in a performance limiting cognitive state, the likelihood that the operator may make an error increases and system performance and safety may degrade.

SUMMARY

In one embodiment of the present disclosure, a method is provided for training state-classifiers for classification of cognitive state. A set of multimodal signals indicating physiological responses of an operator are sampled over a time period. A depiction of operation by the operator during the time period is displayed. In response to user input selecting a cognitive state for a portion of the time period, the one or more state-classifiers are trained to map the set of multimodal signals to a set of cognitive states. In training the state-classifiers, the set of multimodal signals sampled in the portion of the time period are used as input to the one or more state-classifiers and the selected one of the set of cognitive states is used as a target result to be indicated by the one or more state-classifiers.

In another embodiment of the present disclosure, a system is provided. The system includes a set of sensors configured to provide a set of multimodal signals indicating physiological responses of an operator to the stimuli (e.g., visual, auditory, and/or tactile) in a first time period. A processing circuit is configured to train one or more state-classifiers to map the set of multimodal signals to a set of cognitive states. The system also includes a display configured to depict operation by the operator in the first time period. The processing circuit is further configured to, in response to user input selecting one of the set of cognitive states and a portion of the first time period, perform the training of the one or more state-classifiers using the set of multimodal signals sampled in the portion of the time period as input to the one or more state-classifiers and the selected one of the set of cognitive states as a target result to be mapped to by the one or more state-classifiers.

These and other features, advantages, and objects of the present invention will be further understood and appreciated by those skilled in the art by reference to the following specification, claims, and appended drawings.

BRIEF DESCRIPTION OF THE DRAWINGS

FIG. 5 shows an example display of cognitive state information for review, in accordance with one or more embodiments;

DETAILED DESCRIPTION

Figure 1:
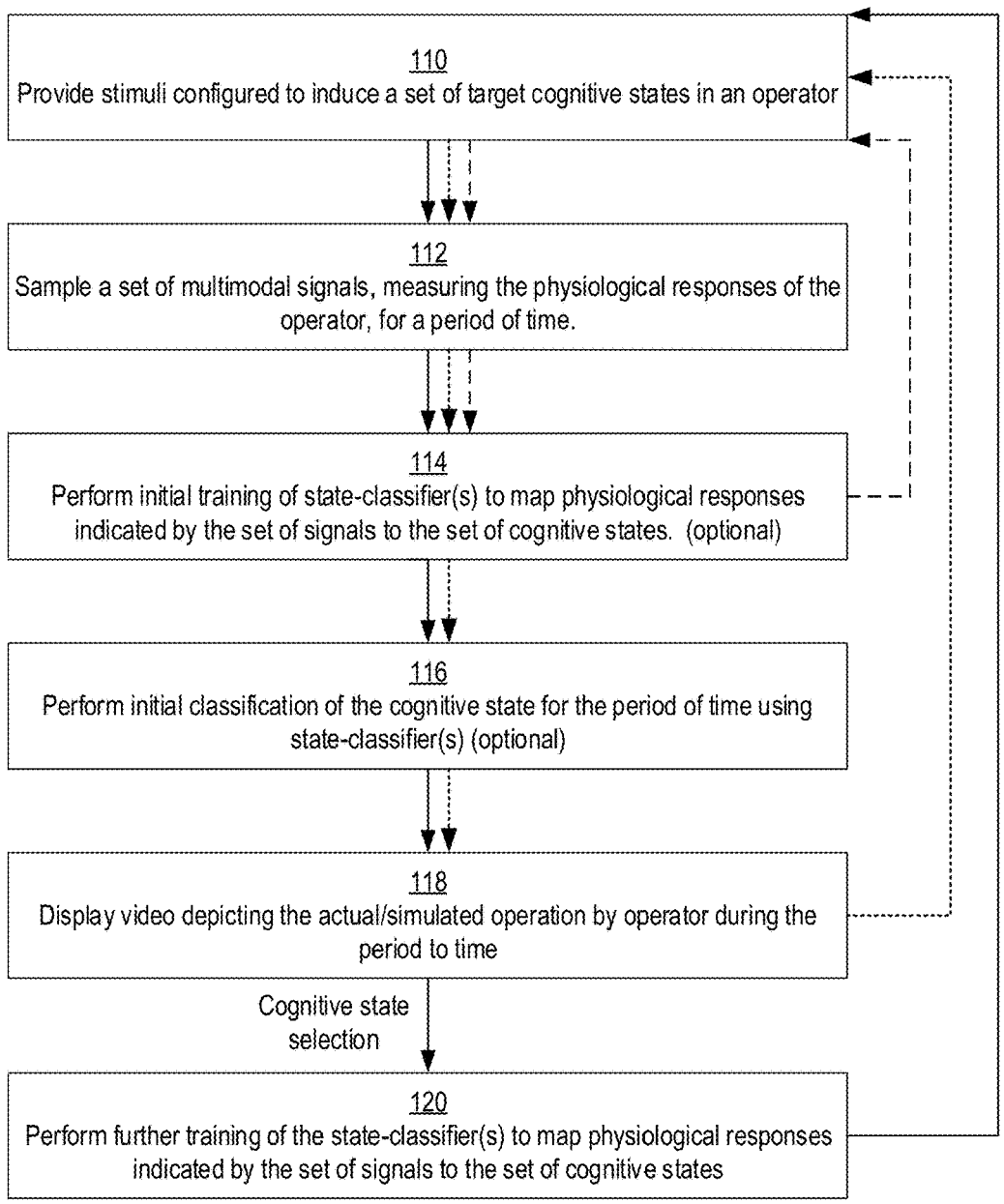
FIG. 1 shows an example process for training state-classifiers to identify cognitive states of an operator from physiological responses, in accordance with one or more embodiments of the present disclosure.

Aspects of the present disclosure are directed to devices, systems, and methods for training state-classifiers for evaluation of cognitive states of an operator. The disclosed devices, systems, and methods are thought to be applicable to a variety of applications, which utilize or are affected by the cognitive state of an operator. These and other aspects of the present disclosure are exemplified in a number of implementations and applications, some of which are shown in the figures and characterized in the claims section that follows.

Cognitive state can be a significant factor effecting efficiency and safety in operation of various systems and/or vehicles. Evaluation of cognitive state, may useful to facilitate operator training and/or enhance operability for a number of applications. Cognitive activity is associated with various physiological responses exhibited by an operator. Cognitive state may be inferred from various sources of physiological data including, for example, sensors measuring electroencephalogram (EEG), event-related potentials (ERP), functional near infrared spectroscopy (fNIRS), electrocardiogram (EKG), heart rate, blood pressure, respiration rate, skin temperature, galvanic skin response (GSR), electromyogram (EMG), pupil dilation, eye movement, voice stress analysis (e.g., based on vocal timbre), and/or facial feature.

Some previous approaches utilize a single physiological measure to perform limited cognitive state evaluation. Such approaches may be useful, for example, to quantify a level of cognitive activity or cognitive workload of an operator. For example, U.S. Pat. No. 5,377,100, issued on Dec. 27, 1994 to Pope et al., and which is incorporated herein by reference in its entirety, describes systems and methods for evaluating a level of mental engagement in a task from an individual's EEG index of attention. However, a single type of physiological response may not be sufficient to distinguish between different cognitive states associated with similar levels of cognitive activity. In one or more embodiments of the present disclosure, cognitive state of an operator may be determined in real time from analysis of data and/or signals acquired from multiple different sources of physiological data. For ease of reference, a set of data and/or signals acquired from multiple different physiological sources may be referred to herein as being multimodal. Data from the individual physiological modalities is fused to take advantage of any synergistic information they provide. Whereas a single indicator may result in a false positive or negative assessment, use of multiple indicators allows machine learning techniques and convergent validity to be leveraged in classification of cognitive states.

Evaluation of cognitive state can be challenging as physiological responses of an operator in a particular cognitive state may vary from person to person. To ensure accurate classification, state-classifiers may need to be individually trained for each operator to map the particular physiological responses of the operator to the set of target cognitive states. In one or more embodiments, a system is configured to present stimuli to induce various target cognitive states in an operator. While presenting the stimuli, multimodal signals indicating physiological responses of the operator are sampled. One or more of the state-classifiers are trained using, for example, supervised and/or unsupervised training techniques to map characteristics of the recorded physiological responses to the target cognitive state intended to be introduced by the presented stimuli.

In some embodiments, one or more state-classifiers may be further refined using review by a human cognitive state specialist. For instance, the system may be configured to display operation to a cognitive state specialist for verification and/or refinement of state-classifiers. Specialist review may be useful, for example, when a target cognitive state may only be achieved for a small portion of the period in which stimuli was presented. For instance, an operator may be required to perform a task for some time before the operator falls into a channelized attention state. In some implementations, the system may provide a graphical user interface (GUI) for display of operation and selection of correct cognitive state by a cognitive state specialist during playback. For instance, the GUI may allow a cognitive state specialist to identify portions of time in which a particular cognitive state is exhibited and/or select the cognitive state to be indicated by the state-classifier(s) for the identified period. State-classifiers may then be retrained to more accurately map the multimodal signals sampled in the identified period to the cognitive state selected by the cognitive state specialist.

Various features are described hereinafter with reference to the figures. It should be noted that the figures are not drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated embodiment need not have all the aspects or advantages shown. An aspect or an advantage described in conjunction with a particular embodiment is not necessarily limited to that embodiment and can be practiced in any other embodiments even if not so illustrated.

Turning now to the figures, FIG. 1 shows an example process for training state-classifiers to identify cognitive states of an operator from physiological responses, in accordance with one or more embodiments of the present disclosure. For ease of explanation, the illustrated flow includes several different paths respectively depicted using hashed, dotted, and solid lines. In different embodiments, the process may follow different ones of the depicted path paths individually or in various combinations. Moreover, in different embodiments, the process may begin along one path for a first loop and change to one or more different paths in later loops.

At block 110, stimuli are provided to induce a set of target cognitive states in an operator. The stimuli may be provided, for example, by simulated or actual operation of an aviation system by the operator. Additionally or alternatively, stimuli may include performance of various tasks. For example, videogames may be used to induce various cognitive states in a player. For instance, a game involving continuous repetitive gameplay (e.g., TETRIS) may be used in some embodiments to induce a channelized attention state. In some embodiments, the stimuli may induce various cognitive states by playing a video for the operator. For example, an immersive movie having a pilot protagonist who encounters a sudden emergency may be used to cause an observer to sympathetically exhibit a startle state. As another example, a movie may be filmed from the point of view of a pilot. Roleplay may also be used by the observer to make a movie more immersive. For instance, the observer may be instructed to verbally respond to other characters (e.g., a co-pilot) in the movie. Alternatively or additionally, an actor in another room may provide ad-lib voice-over dialog for another character in the movie to make interactions more natural. Various other forms of stimulation may additionally or alternatively be used, alone or in combination, to induce different cognitive states.

At block 112, a set of multimodal signals measuring physiological responses of the operator are sampled for a period of time while providing the stimuli at block 110. The multimodal signals indicate physiological responses of the operator to the stimuli. Optionally, at block 114, state-classifiers may be initially trained to map physiological responses indicated by the sampled multimodal signals to the set of target cognitive states. Training may be performed, for example, using automated supervisory-type machine learning algorithms. Depending on the implementation, the training processes may be repeated by looping back to block 110 (as illustrated by the dashed line) to sample multimodal signals for additional stimuli and further training at block 114. Alternatively, a set of state-classifiers may be programed to a default configuration and used without any initial training at block 114. A default configuration of the state-classifiers may be generated, for example, based on average settings of a plurality of state-classifiers trained for a sample group. Following or in lieu of initial training at block 114, the process proceeds to block 116. At block 116, default, partially-trained, or fully-trained state-classifiers may be used to determine cognitive state(s) of the operator in the sample period based on a sampled set of multimodal signals. In some embodiments, the process may skip classification at block 116 until training of state-classifiers is completed.

In this example, a depiction of operation during the sample period is displayed at block 118. Operation may be depicted differently in various embodiments. For instance, in some embodiments, operation may be depicted using actual video of the operator or operating environment during simulation or operation (e.g., using internal and/or external vehicle cameras). Alternatively or additionally, the display may depict vehicle controls, gauges, and/or operator inputs during operation in the sample period. In some embodiments, the process may additionally or alternatively show values of the multimodal signals and/or cognitive state probabilities determined by the classification performed at block 116. Display of the determined probabilities may be useful, for example, for quickly evaluating correctness/confidence level of the cognitive-state classification.

As previously described above, in some embodiments, the display of the operation may be used for review and/or more accurate classification by a classification specialist. This approach may be particularly helpful where an operator achieves the target cognitive state during a small portion of the period in which stimuli for a particular cognitive state is provided. In review of operation, the specialist may identify the portion of the time in which the operator was in particular target cognitive states. If a cognitive state is selected by a specialist, the process proceeds to block 120. At block 120, training of one or more state-classifiers is continued to more accurately map the set of multimodal signals sampled at block 112 to the correct cognitive states, as revised by the cognitive state selection following block 118. After completing training at block 120, the process may loop back to block 110, where the process may be continued, for example, using a different set of stimuli.

In some embodiments, operation may be displayed at block 118 without specialist guided training at block 120. For instance, as depicted by the dotted line path in FIG. 1, the process may loop from block 118 to block 110, where the process may be continued, for example, using a different set of stimuli. This arrangement may be useful, for example, to display cognitive state determinations to help self-guide an operator to a particular target cognitive state for acquisition of multimodal signal data. The display of cognitive state determinations may additionally or alternatively be useful to facilitate evaluation and/or instruction of operators during training. For instance, a flight school instructor may utilize the cognitive state to ensure that a student pilot acts appropriately when a certain cognitive state is encountered. Similar to teaching pilots to recognize symptoms of hypoxia or fatigue and respond appropriately, cognitive state determination may be used to train pilots to quickly recover from a performance limiting cognitive state (e.g., channelized attention state). The multimodal signal data may be used for analysis and/or guided training by a cognitive state specialist at a later time, for example, to refine training of the state-classifiers.

It is recognized that for some applications, the processes may be performed at different locations or times. In some embodiments, the entire process for training state-classifiers may be performed at a single location (e.g., a training facility). In some other embodiments, sampling of multimodal signals may be performed at a first location and display of operation, selection of a correct cognitive state by a specialist, and/or further training may be performed at a second location. For example, in some embodiments an aircraft may include a first system configured to record multimodal signals and video of an operator during flight. At a second location, a second system may be used to review recorded data and identify cognitive states, as previously described. The recorded data and identified cognitive states may be used for training and/or retraining of state-classifiers on either the second system or an additional third system.

Figure 2:
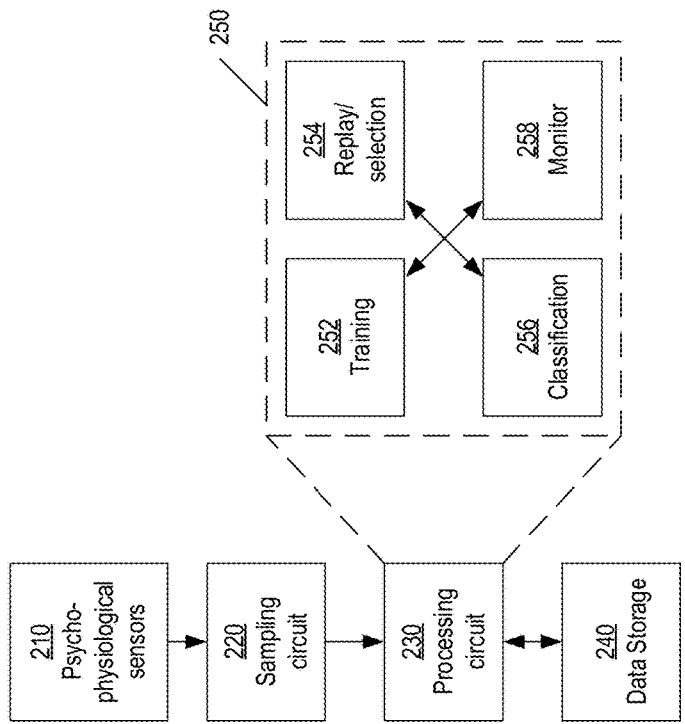
FIG. 2 shows a block diagram of an example system for state-classifier training and evaluation of cognitive states, in accordance with one or more embodiments of the present disclosure.

FIG. 2 shows a block diagram of an example system that may be used for classifier training and/or evaluation of cognitive states, in accordance with one or more embodiments of the present disclosure. As previously described, evaluation of cognitive state of an operator is based on an analysis of multimodal signals, which indicate physiological responses of an operator, using one or more state-classifiers. The system 200 includes a number of physiological sensors 210 configured to measure physiological information from an operator. In different embodiments, the physiological sensors 210 may perform a wide variety of different physiological measurements including, for example, electroencephalogram (EEG), event-related potentials (ERP), functional near infrared spectroscopy (fNIRS), electrocardiogram (EKG), heart rate, blood pressure, respiration rate, skin temperature, galvanic skin response (GSR), electromyogram (EMG), pupil dilation, eye movement, voice stress analysis (e.g., based on vocal timbre), and/or facial feature. Industry-standard methods and devices for measuring these physiological signals may be used as the physiological sensors 210, including but not limited to an electroencephalograph, an electrocardiograph, a thermometer, a galvanic skin response device, cardiotachometer, respiration monitor, an electromyogram, imaging device and/or a microphone.

The multimodal signals produced by physiological sensors 210 are sampled by sampling circuit 220. The sampling circuit may be implemented using, for example, one or more analog to digital converters (ADCs) configured to quantize samples of analog signals provided by the physiological sensors 210 to produce a set of digital signals. In some implementations, the sampling circuit 220 may include various other circuits for processing the analog and/or digital signals. Such processing may include, for example, amplification of signals and/or conditioning of the signals to remove noise artifacts.

Signals sampled by the sampling circuit 220 are provided to a processing circuit 230 for evaluation. In this example, the sampled multimodal signals are provided directly to the processing circuit 230. Alternatively, the sampling circuit may store the sampled multimodal signals (e.g., in data storage 240) for later retrieval by the processing circuit 230. The processing circuit may be configured to implement one or more processes 250 for evaluation of the multimodal signals. In this example, the processes 250 include a process 252 for training of state-classifiers (e.g., stored in data storage 240) based on a set of sampled multimodal signals (e.g., using supervised and/or unsupervised learning techniques). The processes 250 in this example also include a process 254 for replay/display of operation and/or selection of a correct cognitive state. As described with reference to FIG. 1, a specialist may review and select a correct cognitive state determination to be used for further training of state-classifiers.

In this example, the processes 250 further include a process 256 for evaluating cognitive state using the trained state-classifier(s) and the multimodal signals sampled by sampling circuit 220. The process 256 may be implemented differently in various embodiments depending on how state-classifier(s) are implemented. In some implementations, the process 256 may receive, buffer, and input sampled multimodal data to a single state-classifier and store output data in data storage 240. In some other implementations, the process 256 may receive, buffer, and input sampled multimodal data to a plurality of different state-classifiers and make a cognitive state determination based on a comparison of data output from the state-classifiers. For example, in one or more applications, the system may utilize a respective state-classifier for evaluation of each cognitive state. The classifiers may indicate respective probabilities that the operator is in the different cognitive states. The process 256 may then make a cognitive state determination based on the determined probabilities.

In some embodiments, the processing circuit 230 may also be configured to implement a process 258 configured to monitor the cognitive state determination and trigger various actions in response to the determined cognitive state. For instance, in some applications the process 258 may trigger various actions in response to the cognitive state and/or multimodal signals satisfying a set of criteria. The criteria and actions to be performed may be specified for example in a settings file stored in the data storage 240. As an illustrative example, the process 258 may be configured to generate an audible alert in response to an operator exhibiting a performance limiting state (e.g., an inattentive or channelized state).

As another example, the process 258 may be configured to evaluate confidence in the cognitive state determination and trigger retraining of the state-classifiers (e.g., by process 252) in response to the confidence level being less than a threshold value. Additionally or alternatively, state-classifiers may be adjusted on the fly to compensate for differences in responsiveness or accuracy of different sensors (e.g., difference between sensors used for training and sensors in vehicle being operated). For instance, multimodal signals sampled in a baseline cognitive state may be used to recalibrate sensors to match a set of averages values for the operator.

As another example, the process 258 may trigger providing an alert or displaying particular information (e.g., to an instructor during a training session). Such information may include, for example, sampled multimodal signals, cognitive state probabilities, and/or data metrics summarizing analysis thereof. Such information may be useful, for example, to aid in assessment of training performance and providing of instructional feedback.

As yet another example, the process 258 may adjust a training program of a simulator based on the cognitive state determinations. For instance, in some implementations, the process 258 may prompt a simulator to provide cognitive-state based feedback to an operator. Such feedback may help to train an operator to recognize when they have entered a performance limiting cognitive state. Additionally or alternatively, the process 258 may prompt the simulator to provide positive reinforcement when good cognitive states are observed. For instance, the simulator may be prompted to provide a reward (e.g., reduced simulation time) in response to the operator recovering from a performance limiting cognitive state or in response to the operator maintaining an effective cognitive state for a requisite time period.

In some embodiments, the system 200 may provide an interface for an authorized user (e.g., an instructor), to dynamically adjust criteria and/or actions triggered by process 258 during operation. For example, the system may be configured to enable triggering of a particular action in response to a first user input (e.g., from the instructor) and disable triggering of the action in response to a second user input. As an illustrative example, the system 200 may be configured to allow an instructor to enable/disable automated feedback provided to a trainee operator by process 258. For instance, the system 200 may be configured to an instructor may wish to disable automated feedback and provide verbal feedback in a first time period (e.g., while the instructor is physically present). At a later time, the instructor may leave to check on a second trainee operator. At which time, the instructor may enable triggering of automated feedback to the first trainee operator by the process 258. Furthermore, the instructor may wish to customize automated feedback provided to each trainee operator based on in-person observations.

In different embodiments, the processes may be implemented using various technologies including, for example, by software running on a general purpose processor, dedicated hardware application specific integrated circuits (ASICs), or by programmable integrated circuits (e.g., field programmable gate arrays) having programmable circuits configured to form circuits for performing the process. Moreover, the processing circuit may be configured to implement one or more of the processes 252, 254, 256, or 258 individually or in various combinations. Where the processing circuit is configured to implement multiple ones of the processes, the respective processes may be performed by separate sub-circuits within the processing circuit, or by one or more shared circuits within the processing circuit.

Depending on the application, in some embodiments, the system 200 may include various hardware or software components in addition to those depicted in FIG. 2. For example, at a training location the system may include a simulator or display configured to provide stimuli to induce various target cognitive states in the operator. Conversely, in some embodiments, the system 200 may omit one or more components shown in FIG. 2. For example, in some embodiments, multimodal signals may be sampled by a system at a first location and communicated to a different system at a second location for processing. At the second location, the system would not require a sensors 210 or sampling circuit 220.

Figure 3:
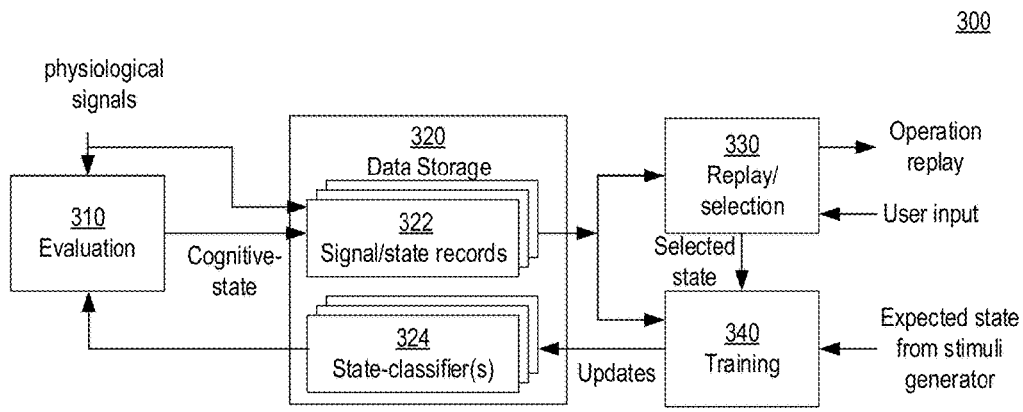
FIG. 3 shows a block diagram of an example system for state-classifier training and evaluation of cognitive states, in accordance with one or more embodiments of the present disclosure.

FIG. 3 shows a block diagram illustrating data flow in an example system for state-classifier training and evaluation of cognitive states, in accordance with one or more embodiments of the present disclosure. The system 300 includes a circuit 310 configured to perform a process (e.g., 256) for evaluation of sampled physiological signals. Using one or more state-classifiers 324, stored in a data storage circuit 320, the circuit 310 determines a cognitive state of the operator. In this example, the data storage circuit 320 also stores records 322 of the physiological signals and determined cognitive states. In some embodiments, the data storage circuit 320 may also store recordings (not shown in FIG. 3) of operation from the time period in which the physiological signals where sampled.

In this example, the records of the multimodal signals, cognitive states determinations, and/or recordings of operation are provided to a circuit 330 configured to provide a GUI for replaying a depiction of operation for review by a cognitive state specialist. Via the GUI, the specialist may select and/or adjust cognitive state determination for refined training of the state-classifiers 324.

The records 322 may be retrieved from data storage 320 for training of the state-classifiers 324 by a training circuit 340. As previously described, the training process configures state-classifiers 324 to more accurately map the physiological signals to the correct cognitive state. If the cognitive state determined by evaluation circuit 310 does not match the correct cognitive state, the training circuit adjusts the state-classifiers to improve the mappings. In some implementations, the correct cognitive state may be provided by a simulation device that provided stimuli to induce a target cognitive state. Alternatively or additionally, the correct cognitive state may be selected by a review specialist via the graphical user interface 330.

The adjustment to state-classifiers 324 may be performed using various processes known in the art for algorithmic training. As one example process, the adjustment may be performed using an evolutionary algorithmic approach in which a number of small adjustments are performed and compared to the original. Adjustments may be pseudo-random or may be selected according to a predetermined process. In a neural-network-based classifier, for example, the adjustment may change weighting or connections of one or more neural nets connected to an output for the correct cognitive state. The adjusted classifiers are then evaluated by processing a set of test data and the performance is compared to that of the original classifier. If one of the adjusted classifiers provides better mapping, it is used to replace the original classifier in the data storage 320 and is used going forward.

Figure 4:
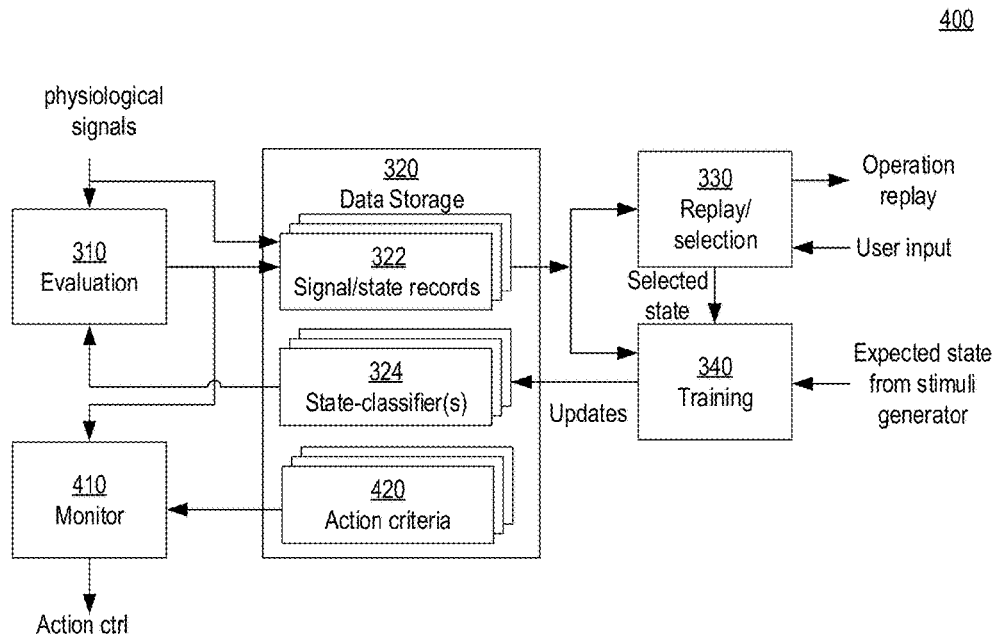
FIG. 4 shows a block diagram of an example system for state-classifier training and evaluation of cognitive states, in accordance with one or more embodiments of the present disclosure.

FIG. 4 shows a block diagram of another example system for classifier training and evaluation of cognitive states, in accordance with one or more embodiments of the present disclosure. The system 400 includes a number of components similar to those shown in FIG. 3. For ease of explanation, similar components are depicted using the labels from FIG. 3. In addition to the components 310, 320, 320, 322, 324 and 340 described with reference to FIG. 3, the system 400 includes a monitor circuit 410 configured to monitor cognitive states determined by the evaluation circuit 310. Additionally or alternatively, the monitor circuit 410 may be configured to monitor the physiological signals provided to the evaluation circuit 310. As described with reference to process 258 in FIG. 2, in some embodiments, the monitor circuit 410 may be configured to trigger various actions in response to the multimodal signals and/or determined cognitive states satisfying a set of criteria 420 stored in the data storage 320.

A particular set of criteria and/or resulting actions may be applied to: an individual operator or machine/vehicle; one or more groups of particular operators, machines, and/or vehicles; and/or operators, machines, and/or vehicles company/fleet wide. For example, a first set of actions and triggers may be applied to all operators and a second set of actions and triggers may be applied to only a subset of the operators (e.g., operators in training). In this manner, criteria and/or triggered actions can be more specifically tailored for particular applications.

In some embodiments, one or more sets of criteria and/or triggered actions may be hard-coded by the manufacturer and stored in a non-volatile data storage. Additionally or alternatively, one or more one or more sets of criteria and/or triggered actions may be customized by an operator or other authorized user (e.g., instructor or supervisor). In some implementations, the GUI provided by circuit 330 may include an interface for customization of criteria and/or actions to be triggered. Additionally or alternatively, in some implementations, a system may provide a web accessible interface for configuration of criteria and/or triggered actions by an authorized user.

Figure 5:
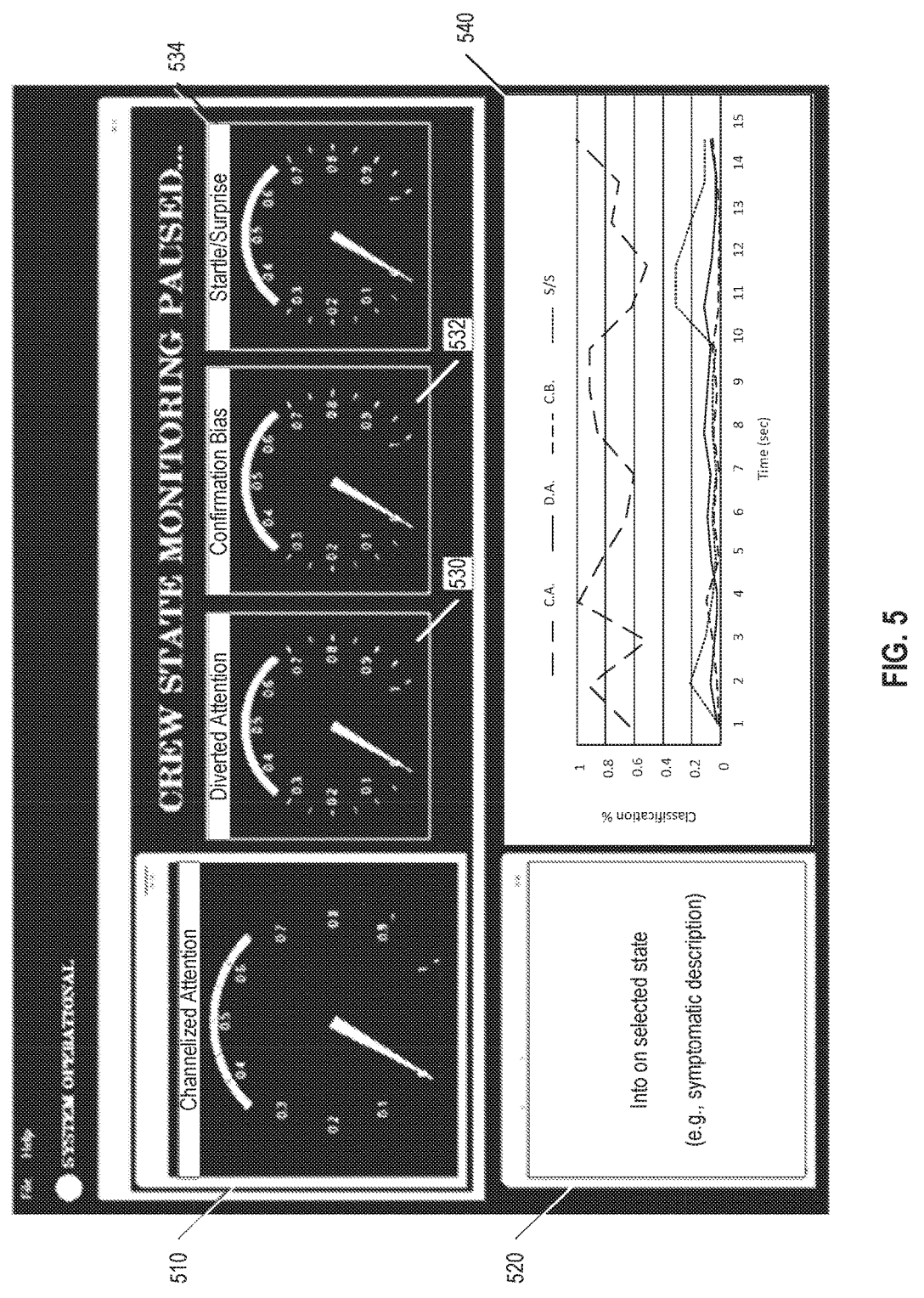

FIG. 5 shows an example display of cognitive state information for review, in accordance with one or more embodiments. In this example, the display includes a number of gauges 510, 530, 532, and 534 indicating respective probabilities that an operator is currently exhibiting different cognitive states including, e.g., channelized attention, diverted attention, confirmation bias, and startle/surprise. In this example, the display also includes a graph 540 showing the determined probabilities for channelized attention (C.A.), diverted attention (D.A.), confirmation bias (C.B.), and startle/surprise (S.S.) over time.

In some embodiments, the display may be included in an interactive GUI. The GUI may allow, for example, for a user to select one of the gauges to get additional information. In this example, the gauge 510 for channelized attention state is selected and is displayed in a slightly larger window, in comparison to the gauges 530, 532, 534 for the other cognitive states. Additional information on the selected state is displayed in window 520. The additional information may include, for example, a description of the cognitive state.

In some embodiments, the window 520 may additionally or alternatively display some analytic data regarding the cognitive state. For example, the window 520 may display average probability of the selected cognitive state, average peak probability value of the selected cognitive state, frequency with which the selected cognitive state is exhibited, average duration in which the cognitive state is exhibited. Analytic data may be derived from previous recorded operation by the operator and/or other operators. Generation of analytics data is described in more detail with reference to FIG. 9.

In various embodiments, the display may omit various information shown in FIG. 5 or may include additional information. For example, the display may include more or fewer cognitive states than those shown in FIG. 5. As another example, in some embodiments, the display may include video of the operator and/or operation environment. In some embodiments, the display may include one or more GUI components (e.g., buttons, checkboxes, drop-down menus, sliders, text fields, etc.) that may be used to select/modify the items displayed. As an illustrative example, a cognitive state specialist may wish to initially review operation without display of probabilities so his/her decision is not influenced by the determination of the state-classifiers. After making a cognitive state determination, the specialist may then wish to display the probabilities to evaluate accuracy of the current state-classifiers for the operator (e.g., via comparison with specialist's cognitive state determinations).

In some embodiments, the display may additionally or alternatively include one or more GUI components (not shown in FIG. 5) for control of playback and/or selection cognitive state for a particular time period (e.g., by a specialist). In some implementations, a selection of cognitive state by the specialist via the GUI components may prompt a system to initiate a process for retraining one or more state-classifiers of the operator to more accurately map the multimodal signals sampled for the relevant time period to the cognitive state selected by the specialist.

Figure 6:
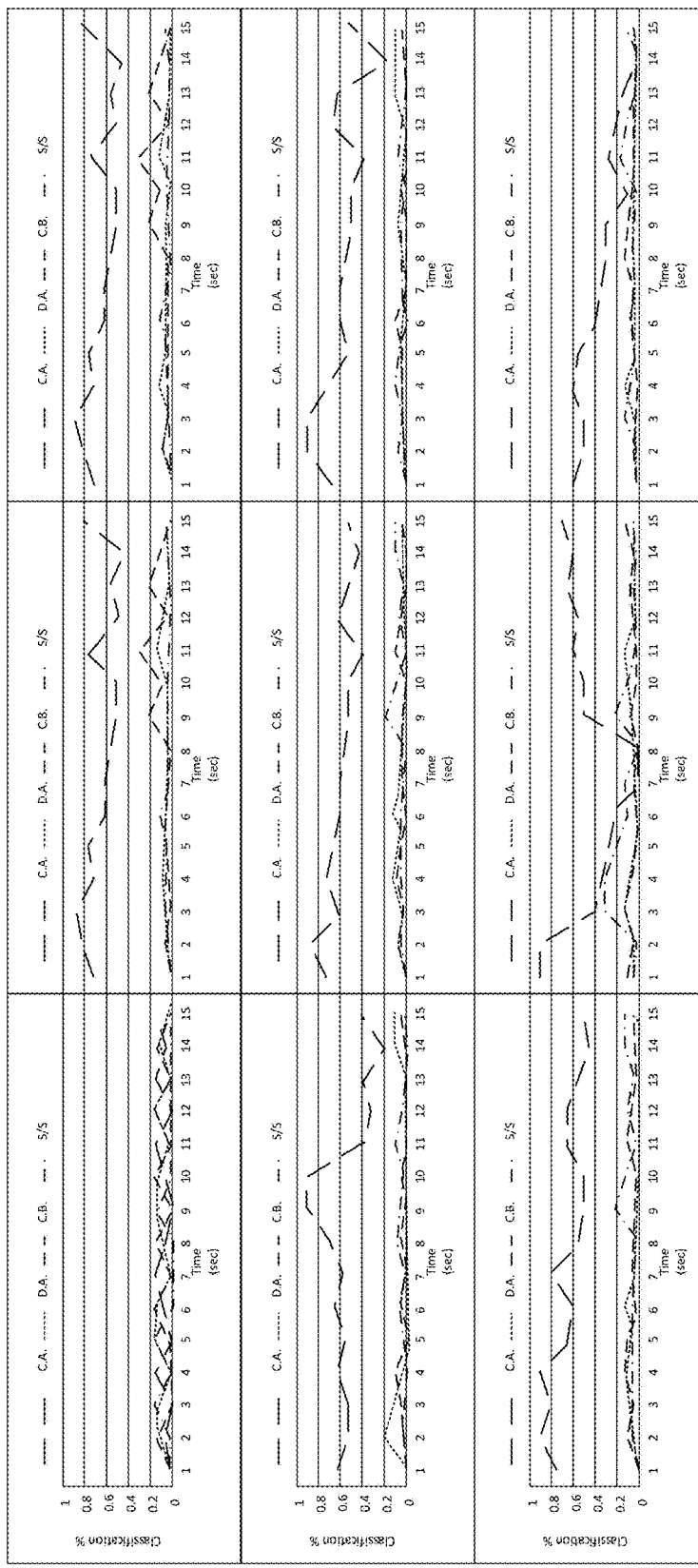
FIG. 6 shows another example display for of cognitive state information for review, in accordance with one or more embodiments.

FIG. 6 shows another example display of cognitive state information that may be used for specialist review, in accordance with one or more embodiments. In this example, the display includes respective graphs for 9 different time periods of operation. Similar to the graph 540 shown in FIG. 5, the graphs display respective probabilities for four cognitive states: channelized attention (C.A.), diverted attention (D.A.), confirmation bias (C.B.), and startle/surprise (S.S.) In each time period, the stimuli may have been presented to induce a different target cognitive state. This layout may be particularly useful, for example, for quick evaluation of operator responses to particular events of interest presented in a training simulation.

Figure 7:
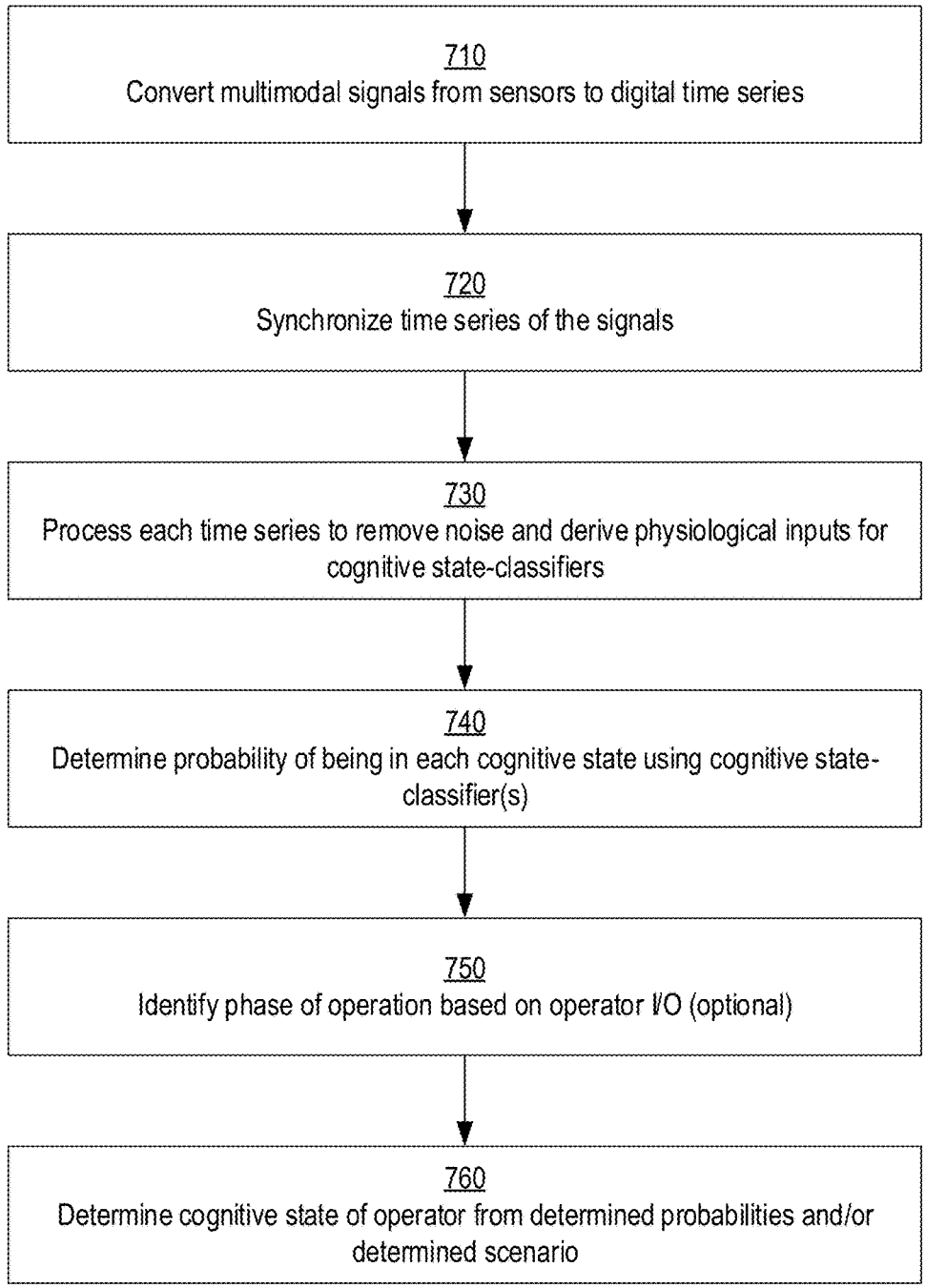
FIG. 7 shows an example process for classifying cognitive state of an operator, in accordance with one or more embodiments of the present disclosure.

FIG. 7 shows an example process for classifying cognitive state of an operator, in accordance with one or more embodiments of the present disclosure. At block 710, analog multimodal signals from sensors are converted to digital time series (e.g., using a sampling circuit). At block 720, the digital time series are synchronized in the time domain. One or more time series may be processed at block 730 to remove noise and derive inputs for state-classifiers.

In different embodiments, the state-classifiers may be implemented using various logic structures to map multimodal signals to cognitive states. Some example logic structures that may be utilized include, but are not limited to, neural networks, evolutionary/genetic algorithms, static preprogrammed functions, look up tables, or various combinations thereof. In some embodiments, classification may be performed by a plurality of state-classifiers arranged in a hierarchy having a plurality of levels. For example, a first set of state-classifiers may be each configured to output a probability that a respective cognitive state is being exhibited by an operator. A second set of classifiers may receive and evaluate the probabilities from the first set of state-classifiers, and/or other data sources, to determine the most likely cognitive state being exhibited. In this example, respective probabilities of being in each cognitive state is determined using one or more state-classifiers at block 740.

Optionally, an operation scenario may be identified at block 750 using a scenario classifier. For instance, based on recorded flight data of an aircraft (e.g. recorded by a black box), it may be possible to identify certain flight scenarios (e.g., takeoff, landing, equipment failure, etc.). Knowledge of the operation scenario may assist a state-classifier in more accurately determining cognitive state. As an illustrative example, it may be typical for a pilot to exhibit a higher heart rate during landing in comparison to flight at cruising altitude. Accordingly, a state-classifier may be trained to require a higher heart rate to classify an operator as being startled when in a landing scenario.

At block 760, the cognitive state of an operator is determined based on the determined probabilities and/or determined scenarios. As previously described, the cognitive state determination may be performed using one or more additional state-classifiers. For instance, one or more additional state-classifiers may adjust probabilities determined at block 740 (e.g., based on phase of operation). The additional state-classifiers may determine the most likely cognitive state based on the adjusted probabilities.

Figure 8:
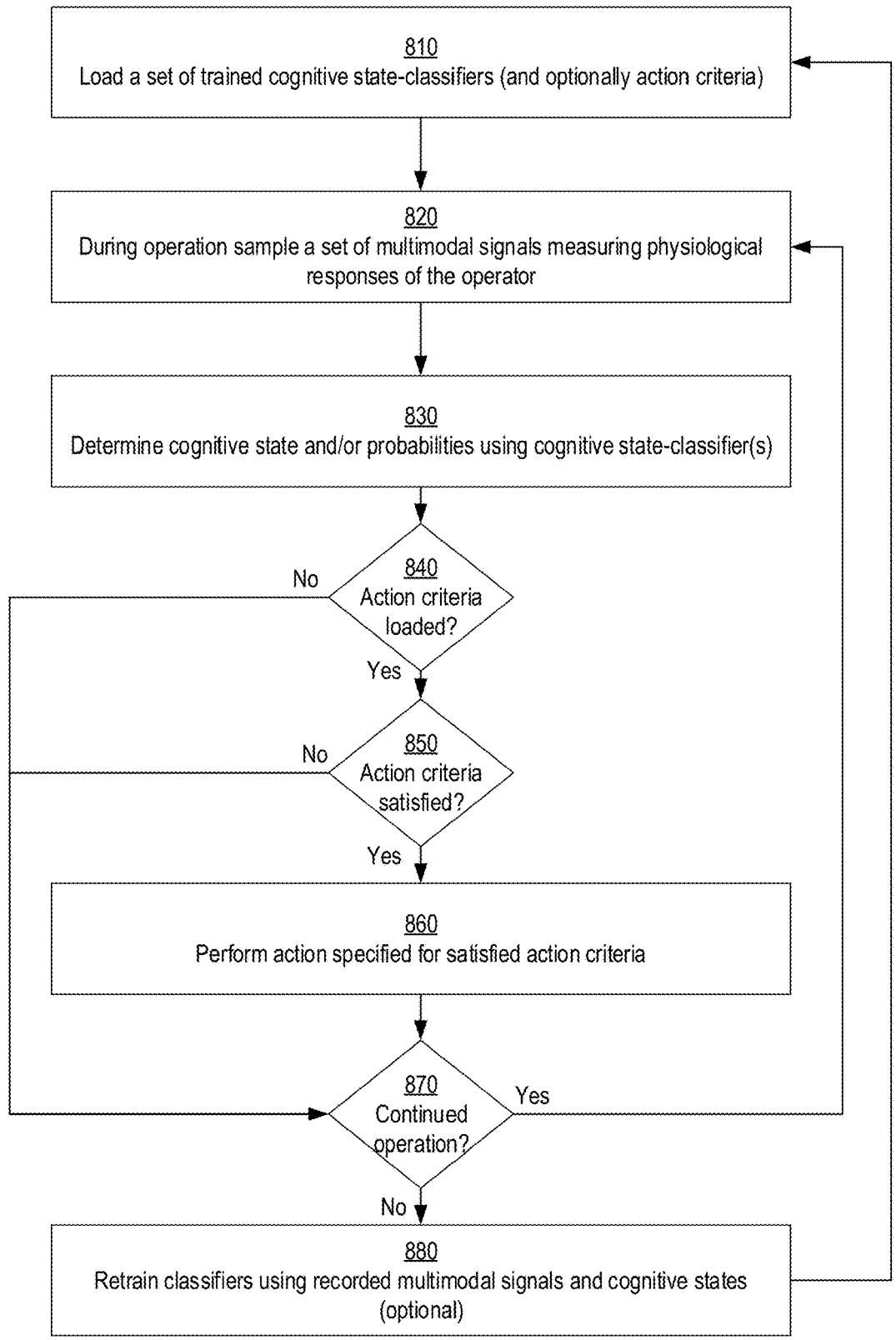
FIG. 8 shows an example process for controlling operations based on real time assessment of cognitive state, in accordance with one or more embodiments.

FIG. 8 shows an example process for real time assessment of cognitive state, in accordance with one or more embodiments. At block 810, a set of trained state-classifiers for the operator is loaded. Optionally, a set of action criteria specific to the operator and/or operation may also be loaded. During operation, a set of multimodal signals measuring physiological responses of the operator are sample at block 820. At block 830, probabilities of the operator being in the respective cognitive states are determined using the trained state-classifiers. If action criteria are loaded, at decision block 840, the process continues to decision block 850. Otherwise, the process continues to decision block 870. If probabilities, multimodal signals, and/or other inputs do not satisfy the loaded action criteria, at decision block 850, the process continues to decision block 870. Otherwise, the process continues to block 860. At block 860, an action specified for the satisfied action criteria is performed. As previously described, the process may perform various actions in response to the multimodal signals and/or determined cognitive states satisfying a set of criteria. While operation continues, the process is directed from decision block 870 back to block 820 and the process is repeated. Once operation is concluded, the process optionally continues from decision block 870 to block 880. At block 880, the trained state-classifiers are retrained using the captured set of signals (e.g., using review by specialist). The retrained state-classifiers may then be used to provide improved classification next time cognitive state-classifiers are loaded (e.g., next training session or flight).

Figure 9:
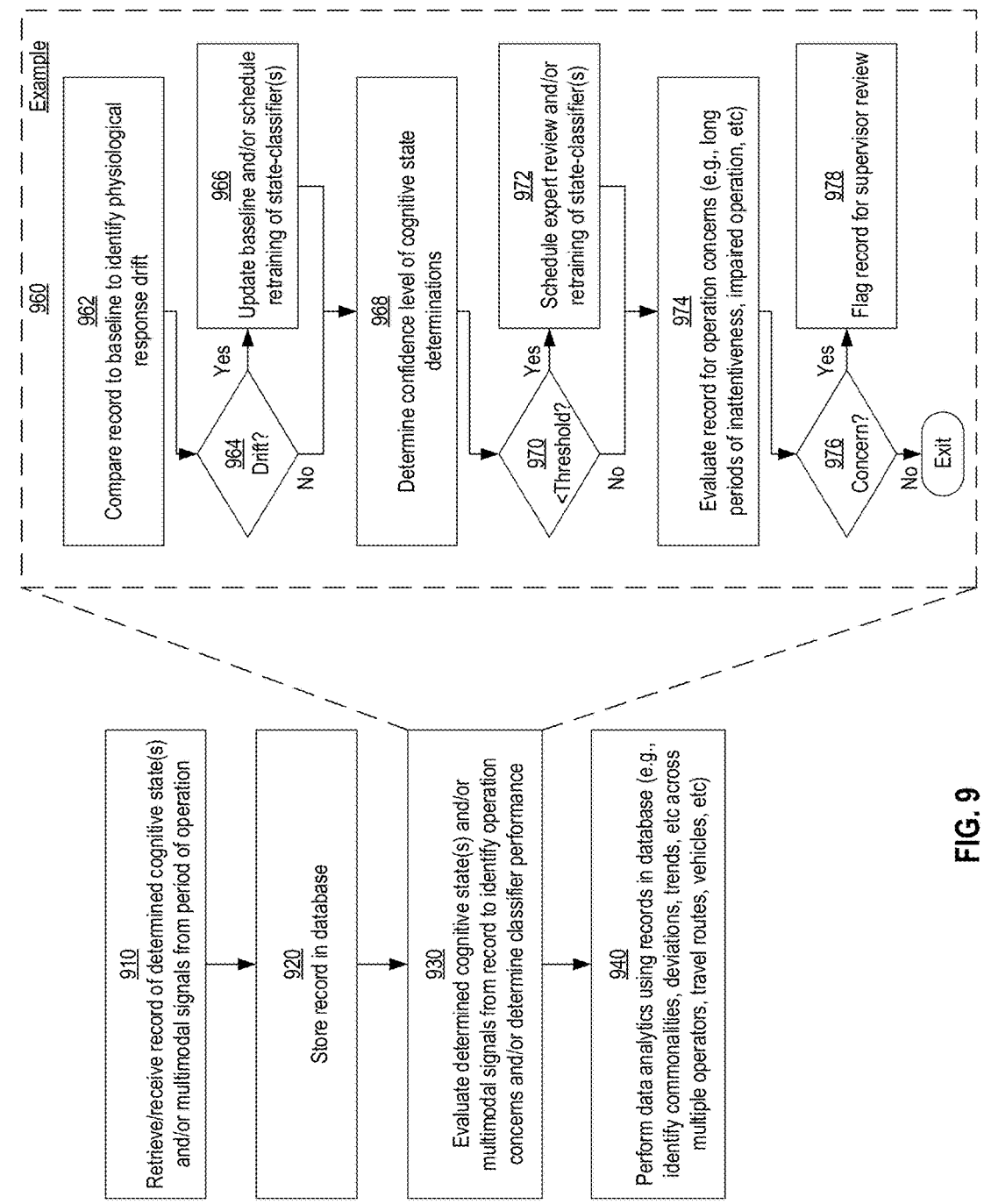
FIG. 9 shows an example process for post-operational training and analytics, in accordance with one or more embodiments of the present disclosure.

FIG. 9 shows an example process for post-operational training and analytics, in accordance with one or more embodiments of the present disclosure. At block 910, records of multimodal signals input to classifiers and outputs from classifiers are retrieved and/or received. Records may be uploaded to a centralized system, for example, automatically in real time and/or after operation has completed. At block 920, the received records are stored in a database. At block 930, cognitive state and/or multimodal signals in the record are evaluated to identify operation concerns and/or determine classifier performance for the individual record. Different embodiments may employ various processes for evaluation of the cognitive state and/or multimodal signals at block 930.

Block 960 shows an example process that may be used for the evaluation at block 930 in one or more embodiments. At block 962, the multimodal signals in the record are compared to those in a baseline record for the operator to identify physiological response drift. Drift may occur as an operator becomes desensitized to certain stimuli and/or situations. For example, the average heartrate exhibited by a pilot in training may decrease as the pilot becomes more experienced and operation becomes more routine. If drift is identified, decision block 964 directs the process to block 966, where the baseline record is updated to account for the drift and/or retraining of state-classifiers is rescheduled.

Following block 966 or if drift is not identified, the process proceeds to block 968. At block 968, a confidence level of the cognitive state determination is determined. In some implementations, confidence level may be quantified by the difference between the highest two probabilities for the cognitive states. For example, difference greater than 50% may indicate a high level of confidence in the determined cognitive state. Conversely, a 5% difference may indicate a low level of confidence in the determined cognitive state. If the confidence level is below a threshold level, the process is directed from decision block 970 to block 972. At block 972, the process schedules expert review of the record and/or retraining of the state-classifier(s).

Following block 972 or if confidence is above the threshold, the process proceeds to block 974. At block 974, the record is evaluated for one or more operation concerns. Operation concerns may include, for example, impaired operation or long periods of operating in a performance limiting state. If operation concern is detected, the process is directed from decision block 976 to block 978. At block 978, the record is flagged for review by an instructor and/or supervisor.

In this example, after evaluating the cognitive state and/or multimodal signals at block 930, data analytics are performed on the data base records at block 940. In various embodiments, the data analytics may be performed, for example, to identify commonalities, deviations, and/or trends, across multiple operators, vehicles, routes, etc. For example, analytics may compare cognitive state of several pilots to identify contributing factors linked to high rates of performance limiting cognitive states. For instance, it may be shown that pilots exhibit higher rates of performance limiting cognitive states when flying a particular type of plane or operating in a particular cockpit layout. Furthermore, records gathered from simulation using a new cockpit layout may be used to provide comparative evaluation of the layout prior to manufacture—thereby allowing changes to be made earlier in the design process.

As another example, the analytics may be used to improve training of state-classifiers. For instance, data from a training simulations may be aggregated from a large number of operators to determine default/initial state-classifier(s) that most closely match responses from all of the operators. Using the determined default/initial state-classifier(s), state-classifiers for new operators may be trained more quickly.

As another example, in some embodiments analytics may be used to aid in unsupervised training of state-classifiers. For instance, existing analytics data may be used to estimate correct cognitive state classification for unsupervised training of operators. For instance, a record of multimodal signals of a first operator having an unknown cognitive state may be compared to other records to find a similar set of multimodal signals. The similar set of multimodal signals may have been exhibited, for example, by the operator in a previous training session or by a second operator. The corresponding cognitive state of the second operator may be used as the correct cognitive state for training state-classifier(s) of the first operator. In this manner, unsupervised training may be performed. Analytics may be combined with various supervised and/or unsupervised training techniques known in the art to improve training of state-classifiers.

In some embodiments, one or more sets of criteria, similar to that described with reference to FIGS. 2 and 4, may be used to trigger actions in response to the post-operation evaluation process performed in block 930 and/or in the analytics process performed at block 940.

The disclosed devices, systems, and methods are thought to be applicable to a variety of applications, which utilize or are affected by cognitive state of an operator. While many of the examples are described in the context of aircraft operation, the embodiments are not so limited. For example, the embodiments may be adapted for use for training, assistance, and/or monitoring of operators of various other vehicles including for example trains, trucks, and/or automobiles. For instance, several embodiments are thought to be particularly applicable to enhance safety in the operation of automobiles. For example, an in-vehicle system could be configured to evaluate cognitive state of a driver in real time and provide an audible alert if the operator exhibits an inattentive cognitive state. As another example, the in-vehicle system could be configured to engage an autonomous driving system, pull the vehicle over, and/or call emergency services in response to a driver becoming unresponsive. As another example, parents could configure an in-vehicle system to remove distractions (e.g., turn off the stereo) in response to a young driver exhibiting a distracted state. As yet another example, the in-vehicle system could be configured to prevent operation of the automobile in response to the driver being in a cognitive state indicative of the operator being under the influence of alcohol. Additionally or alternatively, the in-vehicle system could be configured to provide an alert to a supervisor or parent in response to the driver exhibiting a cognitive state that may be of concern. Alerts may be provided using various different types of messages including, for example, SMS text messages, emails, voice recordings, instant messengers, and/or social network messaging services.

In one or more embodiments, the disclosed methods and systems may be adapted to improve human-computer interfaces in various systems using cognitive state determinations. As one example application, the disclosed embodiments may be adapted to provide adapt videogame control and/or play based on cognitive state of a player. Example systems and methods for manipulating operation of videogames based on a physiological measure of a user are described in U.S. application Ser. No. 14/212,159 entitled PHYSIOLOGICALLY MODULATING VIDEOGAMES OR SIMULATIONS WHICH USE MOTION-SENSING INPUT DEVICES filed Mar. 14, 2014 and U.S. application Ser. No. 13/836,609 entitled METHOD AND SYSTEM FOR PHYSIOLOGICALLY MODULATING VIDEOGAMES AND SIMULATIONS WHICH USE GESTURE AND BODY IMAGE SENSING CONTROL INPUT DEVICES filed Mar. 15, 2013, the entire contents of which being incorporated herein by reference in their entirety. Using the methods and/or systems disclosed herein, the methods and/or systems of U.S. application Ser. Nos. 14/212,159 and 13/836,609 may be adapted to adjust control and/or gameplay according to a plurality of different cognitive states that may be exhibited by a user.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a data server, a VoIP server, or a processing circuit). For example, in certain of the above-discussed embodiments, one or more modules are discrete logic circuits or programmable logic circuits configured and arranged for implementing these operations/activities, as in the blocks shown in FIGS. 2-4. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions. Certain embodiments are directed to a computer program product (e.g., nonvolatile memory device), which includes a machine or computer-readable medium having stored thereon instructions which may be executed by a computer (or other electronic device) to perform these operations/activities.

It will be readily understood that the components of various embodiments of the present disclosure, as generally described and illustrated in the figures herein, may be arranged and designed in a wide variety of different configurations. Thus, the detailed description of the embodiments of the present disclosure, as represented in the figures, is not intended to limit the scope of the invention as claimed, but is merely representative of selected embodiments of the present disclosure.

The features, structures, or characteristics described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present disclosure. Thus, appearances of the phrases "in certain embodiments," "in some embodiments," "in other embodiments," or similar language throughout this specification do not necessarily all refer to the same group of embodiments.

It should be noted that reference throughout this specification to features, advantages, or similar language does not imply that all of the features and advantages that may be realized with the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and/or characteristics may be combined in any suitable manner in one or more embodiments. For example, although aspects and features may in some cases be described in individual figures, it will be appreciated that features from one figure can be combined with features of another figure even though the combination is not explicitly shown or explicitly described as a combination. Moreover, one skilled in the relevant art will recognize that the invention can be practiced without one or more of the specific features or advantages of a particular embodiment illustrated in the figures or described herein. In other instances, additional features and advantages may be recognized in certain embodiments that may not be present in all embodiments of the present disclosure.

One having ordinary skill in the art will readily understand that the embodiments as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. It is intended that the specification and illustrated embodiments be considered as examples only, with a true scope of the invention being indicated by the following claims.

What is claimed is:

1. A system, comprising:
    a set of sensors configured to provide a set of multimodal signals indicating physiological responses of an operator, of a vehicle or device, to stimuli in a first time period;
    a processing circuit configured to train one or more state-classifiers to map the set of multimodal signals to a set of cognitive states; and
    a display configured to depict operation of the vehicle or device by the operator in the first time period;
    a data storage circuit coupled to the processing circuit and configured to store the one or more state-classifiers;
    a second processing circuit coupled to the data storage and configured to determine a cognitive state of an operator using the one or more state-classifiers and the set of multimodal signals as input to the one or more state-classifiers;
    a third processing circuit configured to perform an action specified in a settings file, stored in the data storage, in response to the determined cognitive state of the operator satisfying a set of criteria specified in the settings file;
    wherein the action specified in the settings file includes at least one of a set of actions including adjusting operation of the vehicle or device, providing an alert to the operator, and sending an alert message; and
    wherein the processing circuit is further configured to, in response to user input selecting one of the set of cognitive states and a portion of the first time period, perform the training of the one or more state-classifiers using the set of multimodal signals sampled in the portion of the time period as input to the one or more state-classifiers and the selected one of the set of cognitive states as a target result to be mapped to by the one or more state-classifiers.

2. The system of claim 1, further comprising a second display configured to provide the stimuli configured to induce a set of cognitive states in the operator.

3. The system of claim 1, further comprising a circuit coupled to the set of sensors and configured to sample outputs of the set of sensors to produce the set of multimodal signals.

4. The system of claim 1, wherein the display is configured to provide a graphical user interface for selection of the portion of the time period and selection of the one of the set of cognitive states.

5. The system of claim 1, wherein the third processing circuit is configured to:
    determine a level of confidence in the cognitive state determined by second processing circuit; and
    in response to the level of confidence being less than a threshold level specified in the set of criteria, cause the first-mentioned processing circuit to retrain the one or more state-classifiers.

6. The system of claim 1, wherein
    in response to a first user input, the third processing circuit is configured to provide automated feedback to the operator in further response to the determined cognitive state of the operator being a performance limiting cognitive state; and
    in response to a second user input, the third processing circuit is configured to disable the automated feedback to the operator.

7. The system of claim 1, wherein the third processing circuit is configured to trigger an audible alert or engage an autonomous driving system of the vehicle in response to the determined cognitive state of the operator indicating the operator is in an inattentive or unresponsive cognitive state.

8. A method, comprising:
sampling a set of multimodal signals indicating physiological responses of an operator of a vehicle or device over a time period;
retrieving one or more state-classifiers from a data storage, wherein the one or more state-classifiers are configured to map the set of multimodal signals to a set of cognitive states;
determining respective probabilities of the operator being in the set of cognitive states using the sampled set of multimodal signals as input to the one or more state-classifiers; and
in response to the determined respective probabilities satisfying a set of criteria stored in a settings file performing one or more of a set of actions including adjusting operation of the vehicle or device, providing an alert to the operator, or sending an alert message.

9. The method of claim 8, wherein the performing of one or more of the set of actions provides an audible alert to the operator or engages an autonomous driving system of the vehicle and is performed in response to the determined respective probabilities indicating the operator is in an inattentive or unresponsive cognitive state.

10. The method of claim 8, wherein the performing of one or more of the set of actions prevents operation of the vehicle and is performed in response to the determined respective probabilities indicating the operator is in a cognitive state indicative of the operator being under an influence of alcohol.

11. The method of claim 8, wherein the performing of one or more of the set of actions disables a radio or stereo system and is performed in response to the determined respective probabilities indicating the operator is in an inattentive cognitive state.

12. The method of claim 8, wherein the performing of one or more of the set of actions sends an alert message in response to the determined respective probabilities indicating the operator is in a particular cognitive state specified in the settings file.

13. A method, comprising:
providing a simulation environment including visual, audible, or tactile stimuli, or a combination thereof, configured to induce a target cognitive state in an operator; sampling a set of multimodal signals indicating physiological responses of the operator of a vehicle or device over a lime period;
retrieving one or more state-classifiers from a data storage, wherein the one or more state-classifiers are configured to map the set of multimodal signals to a set of cognitive states, the set of cognitive states including the target state;
determining respective probabilities of the operator being in the set of cognitive states using the sampled set of multimodal signals as input to the one or more state-classifiers; and
in response to the determined probabilities satisfying a set of criteria specified in a settings file, performing one or more of a set of actions, the set of actions including adjusting the visual, audible, or tactile stimuli provided to the operator by the simulation environment and providing an alert to a trainer or supervisor.

14. The method of claim 13, further comprising,
displaying the depiction of operation in a time period;
providing a graphical user interface for selecting portions of the time period and selection of respective ones of cognitive states for the selected portions; and
in response to selection of a portion of the time period and one of the cognitive states, training the one or more state-classifiers to map the set of multimodal signals for the selected portion to the selected one of the cognitive states.

15. The method of claim 14, wherein the displaying the depiction of operation in the time period includes displaying a video recording of the operator in the time period.

16. The method of claim 14, wherein the displaying the depiction of operation in the time period further includes displaying respective probabilities that the operator is in each one of the set of cognitive states during the time period.

17. The method of claim 14, further comprising, prior to the displaying the depiction of operation in the time period, performing initial training of the one or more state-classifiers to map the set of multimodal signals to the set of cognitive states.

18. The method of claim 17, wherein for each of one or more of the set of cognitive states, the initial training includes:
presenting stimuli configured to induce the cognitive state in the operator for a respective portion of the time period;
sampling the set of multimodal signals in the portion; and
mapping the one or more of the physiological responses indicated by the multimodal signals in the portion to the cognitive state.

19. The method of claim 18, wherein capturing of the set of multimodal signals includes:
converting one or more analog signals to digital signals;
aligning the digital signals in time; and
removing noise artifacts from one or more of the digital signals.

20. The method of claim 18, wherein, presenting stimuli includes simulating an operation scenario in a simulator, presenting a video depicting operation by another operator in the operation scenario, or a combination thereof.

* * * * *